(12) United States Patent
Wang

(10) Patent No.: US 12,432,729 B2
(45) Date of Patent: Sep. 30, 2025

(54) TRANSMISSION RESOURCE ADJUSTMENT METHOD AND DEVICE

(71) Applicant: SPREADTRUM COMMUNICATIONS (SHANGHAI) CO., LTD., Shanghai (CN)

(72) Inventor: Tingting Wang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 739 days.

(21) Appl. No.: 17/639,179

(22) PCT Filed: Aug. 21, 2020

(86) PCT No.: PCT/CN2020/110377
§ 371 (c)(1),
(2) Date: Feb. 28, 2022

(87) PCT Pub. No.: WO2021/036913
PCT Pub. Date: Mar. 4, 2021

(65) Prior Publication Data
US 2022/0330305 A1  Oct. 13, 2022

(30) Foreign Application Priority Data
Aug. 28, 2019 (CN) .......................... 201910800145.2

(51) Int. Cl.
*H04W 72/20* (2023.01)
(52) U.S. Cl.
CPC .................................. *H04W 72/20* (2023.01)
(58) Field of Classification Search
USPC ....... 370/229, 230, 236, 252, 280, 294, 321, 370/328, 329, 330, 337, 345, 347
See application file for complete search history.

(56) References Cited

U.S. PATENT DOCUMENTS

2014/0334353 A1* 11/2014 Wei .................... H04W 72/1263
370/280
2015/0003301 A1* 1/2015 He ........................ H04W 88/02
370/280

(Continued)

FOREIGN PATENT DOCUMENTS

CN      105517121 A    4/2016
CN      106028369 A    10/2016
(Continued)

OTHER PUBLICATIONS

International Search Report for International Application No. PCT/CN2020/110377; Date of Mailing, Nov. 25, 2020.

*Primary Examiner* — Nguyen H Ngo
(74) *Attorney, Agent, or Firm* — CANTOR COLBURN LLP

(57) ABSTRACT

The embodiments of the present disclosure provide a method and device for adjusting transmission resource. The method includes: allocating a second transmission resource for a first data based on a time difference, in response to the time difference between a predicted starting moment for a User Equipment (UE) to receive the first data and a starting moment of a preconfigured first transmission resource for receiving the first data being determined greater than or equal to a preset time span, wherein the second transmission resource and the first transmission resource have different time domain resources, and the second transmission resource and the first transmission resource have a same frequency domain resource; and transmitting a notification information to the UE, wherein the notification information is used for notifying the UE to update the first transmission resource to the second transmission resource.

10 Claims, 7 Drawing Sheets

(56) References Cited

U.S. PATENT DOCUMENTS

| | | | |
|---|---|---|---|
| 2015/0208382 A1* | 7/2015 | Yao | H04W 72/0446 |
| | | | 370/280 |
| 2016/0105849 A1 | 4/2016 | Chen et al. | |
| 2016/0286599 A1 | 9/2016 | Weingertner et al. | |
| 2018/0059769 A1* | 3/2018 | Sripathi | G06F 1/3278 |
| 2019/0261255 A1 | 8/2019 | You | |
| 2021/0092740 A1* | 3/2021 | Tang | H04L 25/0224 |

FOREIGN PATENT DOCUMENTS

| | | |
|---|---|---|
| CN | 108024310 A | 5/2018 |
| CN | 110475362 A | 11/2019 |
| CN | 111294946 A | 6/2020 |
| WO | 2018217063 A1 | 11/2018 |

* cited by examiner the network equipment allocates a second transmission resource for a first data based on a time difference, in response to the time difference between a predicted starting moment for a UE to receive the first data and a starting moment of a preconfigured first transmission resource for receiving the first data being determined greater than or equal to a preset time span, wherein the second transmission resource and the first transmission resource have different time domain resources, and the second transmission resource and the first transmission resource have a same frequency domain resource — S201 the network equipment transmits a notification information to the UE, and the notification information is used for notifying the UE to update the first transmission resource to the second transmission resource — S202

FIG. 2 the network equipment allocates a second transmission resource for a first data based on a time difference, in response to the time difference between a predicted starting moment for a UE to receive the first data and a starting moment of a preconfigured first transmission resource for receiving the first data being determined greater than or equal to a preset time span, wherein the second transmission resource and the first transmission resource have different time domain resources, and the second transmission resource and the first transmission resource have a same frequency domain resource — S301 the network equipment transmits a notification information to the UE, the notification information is used for notifying the UE to update the first transmission resource to the second transmission resource. The notification information includes a time indication information, and the time indication information is used for indicating a time shift of a starting moment of the second transmission resource relative to the starting moment of the first transmission resource — S302

FIG. 3

TRANSMISSION RESOURCE ADJUSTMENT METHOD AND DEVICE

CROSS-REFERENCE TO RELATED APPLICATIONS

This is the U.S. national stage of application No. PCT/CN2020/110377, filed on Aug. 21, 2020. Priority under 35 U.S.C. § 119(a) and 35 U.S.C. § 365(b) is claimed from Chinese Application No. 201910800145.2, filed Aug. 28, 2019, the disclosure of which is also incorporated herein by reference.

TECHNICAL FIELD

The present disclosure generally relates to mobile communication technology field, and more particularly, to a method and device for adjusting transmission resource.

BACKGROUND

A Semi-Persistent Scheduling (SPS) is a scheduling method which pre-configures transmission resources periodically. In the SPS, a network equipment configures the transmission resource for a User Equipment (UE) based on service characteristics, and allocates transmission resources to the UE periodically, which makes the UE can use the allocated transmission resources to receive data in each period.

Ideally, the network equipment usually configures the transmission resource to the UE accurately based on service characteristics, that is, a starting moment for the UE to receive data each time is the same as a starting moment of an allocated transmission resource for the UE to receive data this time.

However, for some periodic services with jitter characteristics, in some scenarios, an actual starting moment for the UE to receive data may deviate from a starting moment of an allocated transmission resource for the UE to receive data this time, which may increase a delay of data transmission.

SUMMARY

Embodiments of the present disclosure provide a method and device for adjusting transmission resource, so as to overcome a possible deviation between an actual starting moment for a User Equipment (UE) to receive data and an starting moment of an allocated transmission resource for the UE to receive data this time. Thus, a delay of data transmission is solved.

In an embodiment of the present disclosure, a method for adjusting transmission resource is provided, applied at a network equipment side, the method includes: allocating a second transmission resource for a first data based on a time difference, in response to the time difference between a predicted starting moment for a UE to receive the first data and a starting moment of a preconfigured first transmission resource for receiving the first data being determined greater than or equal to a preset time span, wherein the second transmission resource and the first transmission resource have different time domain resources, and the second transmission resource and the first transmission resource have a same frequency domain resource; and transmitting a notification information to the UE, wherein the notification information is used for notifying the UE to update the first transmission resource to the second transmission resource.

In an embodiment of the present disclosure, a method for adjusting transmission resource is provided, applied at a UE side, the method includes: receiving a notification information transmitted from a network equipment, wherein the notification information is used for notifying the UE to update the first transmission resource to the second transmission resource, the second transmission resource and the first transmission resource have different time domain resources, and the second transmission resource and the first transmission resource have a same frequency domain resource; updating the first transmission resource to the second transmission resource based on the notification information; and receiving data on the second transmission resource.

In an embodiment of the present disclosure, a non-transitory computer readable storage medium storing one or more programs, the one or more programs comprising computer instructions, which, when executed by a processor, cause the processor to: allocate a second transmission resource for a first data based on a time difference, in response to the time difference between a predicted starting moment for a User Equipment (UE) to receive the first data and a starting moment of a preconfigured first transmission resource for receiving the first data being determined greater than or equal to a preset time span, wherein the second transmission resource and the first transmission resource have different time domain resources, and the second transmission resource and the first transmission resource have a same frequency domain resource; and transmit a notification information to the UE, wherein the notification information is used for notifying the UE to update the first transmission resource to the second transmission resource.

BRIEF DESCRIPTION OF THE DRAWINGS

In order to illustrate the embodiments of the present disclosure or the technical solutions in the prior art more clearly, the following briefly introduces the accompanying drawings that need to be used in the description of the embodiments or the prior art. Obviously, the accompanying drawings in the following description are some embodiments of the present disclosure. For those of ordinary skill in the art, other drawings can also be obtained from these drawings without creative effort.

FIG. 2 schematically illustrates a first flowchart of a method for adjusting transmission resource according to an embodiment of the present disclosure;

FIG. 3 schematically illustrates a second flowchart of a method for adjusting transmission resource according to an embodiment of the present disclosure;

DETAILED DESCRIPTION

In order to clarify the object, characteristic and advantages of embodiments of the present disclosure, the embodiments of present disclosure will be described clearly in detail in conjunction with accompanying drawings. Obviously, the described embodiments are some, but not all, embodiments of the present disclosure. Based on the embodiments of the present disclosure, all other embodiments obtained by those of ordinary skill in the art without creative efforts shall fall within the protection scope of the present disclosure.

Wherein, the terms "first", "second", "third", etc. in the embodiments of the present disclosure are used to distinguish similar objects, and are not necessarily used to describe a specific order or sequence. It should be understood that the data so used may be interchanged under appropriate circumstances such that the embodiments of the present disclosure described herein can, for example, be practiced in sequences other than those illustrated or described herein. In addition, the terms "include" and "have" and any variations thereof, are intended to cover a non-exclusive inclusion, for example, a process, method, system, product or equipment including a series of steps or units is not necessarily limited to those steps or units explicitly listed, but may include steps or units not explicitly listed or inherent to the process, method, product or device other steps or units.

Figure 1:
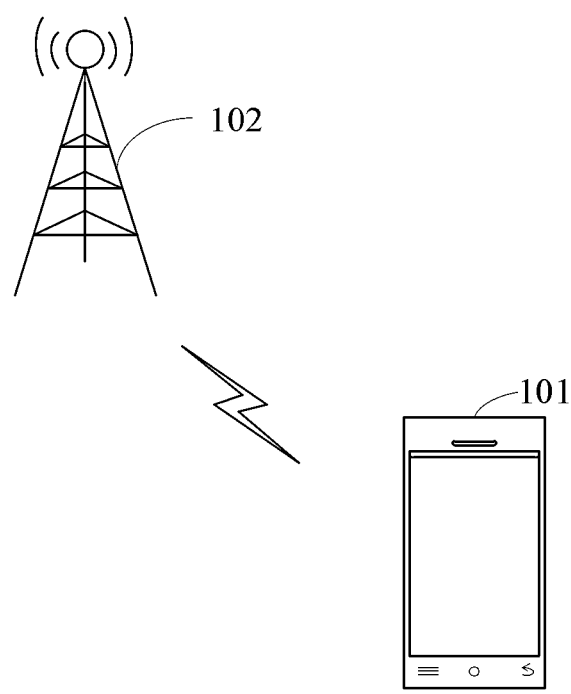
FIG. 1 schematically illustrates an architecture diagram of a system for adjusting transmission resource according to an embodiment of the present disclosure.

Referring to FIG. 1, FIG. 1 schematically illustrates an architecture diagram of a system for adjusting transmission resource according to an embodiment of the present disclosure. The system provided in the embodiment includes a User Equipment (UE) 101 and a network equipment 102.

Wherein, the UE 101 refers to an electronic equipment that can access the network equipment 102 through a wireless communication network, including a mobile terminal, a tablet computer, a wearable device, a vehicle-mounted terminal, and the like. The implementation manner of the UE 101 is not particularly limited in the embodiment, as long as the UE 101 can receive data transmitted from the network equipment 102.

The network equipment 102 includes to a public mobile communication network equipment, that is, an interface equipment for the UE 101 to access the Internet, and also one form of a radio station. It refers to a radio transceiver station that transmits information with the UE 101 in a certain radio coverage area.

In the embodiment of the present disclosure, the UE 101 communicates with the network equipment 102 through a wireless communication network, the method for adjusting transmission resource in the embodiment of the present disclosure may be executed by the UE 101 or the network equipment 102, or the method may be executed jointly by the UE 101 and the network equipment 102. For example, in some embodiment, the network equipment 102 may transmit a notification information to the UE 101; after receiving the notification information, the UE 101 may execute a corresponding tasks based on the notification information. Detailed description is given below by using detailed embodiments.

FIG. 2 schematically illustrates a first flowchart of a method for adjusting transmission resource according to an embodiment of the present disclosure. The method is executed by the network equipment 102 as shown in FIG. 1. As shown in FIG. 2, the method includes S201 and S202.

In S201, the network equipment allocates a second transmission resource for a first data based on a time difference, in response to the time difference between a predicted starting moment for a UE to receive the first data and a starting moment of a preconfigured first transmission resource for receiving the first data being determined greater than or equal to a preset time span, wherein the second transmission resource and the first transmission resource have different time domain resources, and the second transmission resource and the first transmission resource have a same frequency domain resource.

Wherein, in a Semi-Persistent Scheduling (SPS), after the UE applies for a transmission resource once, the network equipment periodically allocates the transmission resource to the UE within a period of time, and the UE uses the transmission resource allocated by the network equipment to receive data every period.

It should be understood that when a time difference between a starting moment for the UE to receive a first data that is available for transmission in a certain period and a starting moment of a first transmission resource for receiving the first data is greater than or equal to a preset time span, it indicates that the starting moment for receiving the first data is earlier or later than the starting moment of the first transmission resource, in this case, the first data cannot be transmitted through the first transmission resource in time, so that the UE cannot receive the first data at the first time, and there is a certain delay.

In the embodiment of the present disclosure, in order to solve the above-mentioned problem, the network equipment may predict in advance whether the time difference between the starting moment for the UE to receive the data that is available for reception in each period and the starting moment of the transmission resource for receiving the data is greater than or equal to the preset time span. When a time difference between a starting moment for the UE to receive a first data that is available for transmission in a certain period and a starting moment of a first transmission resource for receiving the first data is greater than or equal to the preset time span, the network equipment allocates the second transmission resource for the first data based on the time difference, wherein the second transmission resource and the first transmission resource have different time domain resources, but a same frequency domain resource.

Wherein, the starting moment of the second transmission resource and the predicted starting moment for receiving the first data are the same, or a time difference between the starting moment of the second transmission resource and the predicted starting moment for receiving the first data is less than the preset time span.

In S202, the network equipment transmits a notification information to the UE, and the notification information is used for notifying the UE to update the first transmission resource to the second transmission resource.

In the embodiment of the present disclosure, after allocating the second transmission resource, the network equipment transmits the notification information to the UE, the notification information is used for notifying the UE to update the first transmission resource to the second transmission resource, so that the UE can receive the first data through the second transmission resource but not through the first transmission resource.

It should be understood that, if the starting moment of the second transmission resource is the same as the predicted starting moment for receiving the first data, or the time difference between the starting moment of the second transmission resource and the predicted starting moment for receiving the first data is less than the preset time span, the first data may be transmitted through the second transmission resource in time, so the delay in receiving the first data by the UE can be effectively eliminated or reduced.

In the embodiment of the present disclosure, the method for adjusting transmission resource is applied at the network equipment side. When a network equipment determines a time difference between a predicted starting moment for a UE to receive the first data UE and a starting moment of a preconfigured first transmission resource for receiving the first data is greater than or equal to a preset time span, the network equipment allocates a second transmission resource for the first data based on the time difference; wherein the second transmission resource and the first transmission resource have different time domain resources, and the second transmission resource and the first transmission resource have a same frequency domain resource; and the network equipment transmits a notification information to the UE for notifying the UE to update the first transmission resource to the second transmission resource and receive the first data on the second transmission resource. Therefore, the UE does not need to receive the first data on the first transmission resource, thereby effectively eliminating or reducing the delay generated when the UE receives the first data.

Further, based on the content described in the foregoing embodiment, referring to FIG. 3, FIG. 3 schematically illustrates a second flowchart of a method for adjusting transmission resource according to an embodiment of the present disclosure, and the method is executed by the network equipment 102 as shown in FIG. 1. In the embodiment of the present disclosure, the method includes S301 and S302.

In S301, the network equipment allocates a second transmission resource for a first data based on a time difference, in response to the time difference between a predicted starting moment for a UE to receive the first data and a starting moment of a preconfigured first transmission resource for receiving the first data being determined greater than or equal to a preset time span, wherein the second transmission resource and the first transmission resource have different time domain resources, and the second transmission resource and the first transmission resource have a same frequency domain resource.

Wherein, the content described in S301 is basically the same as the principle of the technical solution described in S201 in the foregoing embodiment. For details, reference may be made to the content described in the foregoing embodiment, which will not be repeated here.

In S302, the network equipment transmits a notification information to the UE, the notification information is used for notifying the UE to update the first transmission resource to the second transmission resource. The notification information includes a time indication information, and the time indication information is used for indicating a time shift of a starting moment of the second transmission resource relative to the starting moment of the first transmission resource.

In the embodiment of the present disclosure, after allocating the second transmission resource, the network equipment determines a time shift of a starting moment of the second transmission resource relative to the starting moment of the first transmission resource, and transmits the time shift to the UE through the notification information. The UE may determine the time shift of a starting moment of the second transmission resource relative to the starting moment of the first transmission resource based on the time shift, and determine the starting moment of the second transmission resource based on the starting moment of the first transmission resource and the time shift.

For example, assuming that the starting moment of the first transmission resource is T1, and the starting moment of the second transmission resource is T2, a notification information transmitted to the UE from the network equipment including a time indication information, the time indication information is used for indicating a time shift T (T=T1−T2) of a starting moment of the second transmission resource relative to the starting moment of the first transmission resource. After receiving the time indication information, the UE may determine the starting moment T2 of the second transmission resource based on the time shift and the starting moment T1 of the first transmission resource, that is, T2=T+T1.

Wherein, if sizes of the first transmission resource and the second transmission resource are the same, the UE may also determine an ending moment of the second transmission resource based on the starting moment and an ending moment of the first transmission resource and the determined starting moment of the second transmission resource, and determine the second transmission resource.

If the size of the first transmission resource is different from the size of the second transmission resource, the UE needs to determine a difference in the time domain between the first transmission resource and the second transmission resource, and then the UE may determine the ending moment of the second transmission resource based on the starting moment and the ending moment of the first transmission resource, the determined starting moment of the second transmission resource and the difference, thereby determining the second transmission resource.

Wherein, in an embodiment of the present disclosure, the time indication information may be a specific time shift determined by the network equipment directly, and the time shift is a time shift of the starting moment of the second transmission resource relative to the starting moment of the first transmission resource.

Specifically, after determining the time difference between the predicted starting moment for the UE to receive the first data and the starting moment of the first transmission resource, the network equipment may determine a time shift based on the time difference, and transmit the time shift to the UE as the time shift of the starting moment of the second transmission resource relative to the starting moment of the first transmission resource.

For example, the network equipment transmits a notification information to the UE, the notification information includes a time shift, and the time shift includes a determined time shift of the starting moment of the second transmission resource relative to the starting moment of the first transmission resource.

In another embodiment of the present disclosure, the time indication information may include an index of a time shift, and the index of the time shift includes a time shift of the starting moment of the second transmission resource relative to the starting moment of the first transmission resource.

Specifically, the UE may pre-configure a plurality of possible time shifts, after determining the time difference between the predicted starting moment for the UE to receive the first data and the starting moment of the preconfigured first transmission resource for receiving the first data, the network equipment may search for a time shift that is closest to the time difference among the plurality of possible time shifts preconfigured by the UE, and transmit an index of the searched time shift to the UE. After receiving the index, the UE may determine a particular time shift from the preconfigured plurality of time shifts based on the index, and determine the particular time shift as a time shift of the starting moment of the second transmission resource relative to the starting moment of the first transmission resource.

For example, a UE may pre-configure a plurality of possible time shifts t1, t2, t3, t4 and t5, after determining a time difference between a predicted starting moment for the UE to receive a first data and a starting moment of a preconfigured first transmission resource for receiving the first data, if the time shift t3 is determined as a time shift which is closest to the time difference, a network equipment transmits an index corresponding to the t3 to the UE. After receiving the index, the UE determines the time shift t3 based on the index, and determines the time shift t3 as a time shift of the starting moment of the second transmission resource relative to the starting moment of the first transmission resource.

In the embodiment of the present disclosure, the network equipment may determine a time shift directly as the time shift of the starting moment of the second transmission resource relative to the starting moment of the first transmission resource, based on the time difference between the predicted starting moment for the UE to receive the first data and the starting moment of the preconfigured first transmission resource for receiving the first data. The network equipment may also determine one time shift from the plurality of possible time shifts preconfigured by the UE as the time shift of the starting moment of the second transmission resource relative to the starting moment of the first transmission resource, based on the time difference between the predicted starting moment for the UE to receive the first data and the starting moment of the preconfigured first transmission resource for receiving the first data. And the implementation process is more flexible.

According to the method for adjusting transmission resource provided in embodiments of the present disclosure, after allocating the second transmission resource for the first data, the network equipment may transmit the time shift of the starting moment of the second transmission resource relative to the starting moment of the first transmission resource to the UE. The UE may determine the starting moment of the second transmission resource based on the time shift, update the first transmission resource to the second transmission resource based on the starting moment of the second transmission resource, and receive the first data on the second transmission resource.

Figure 4:
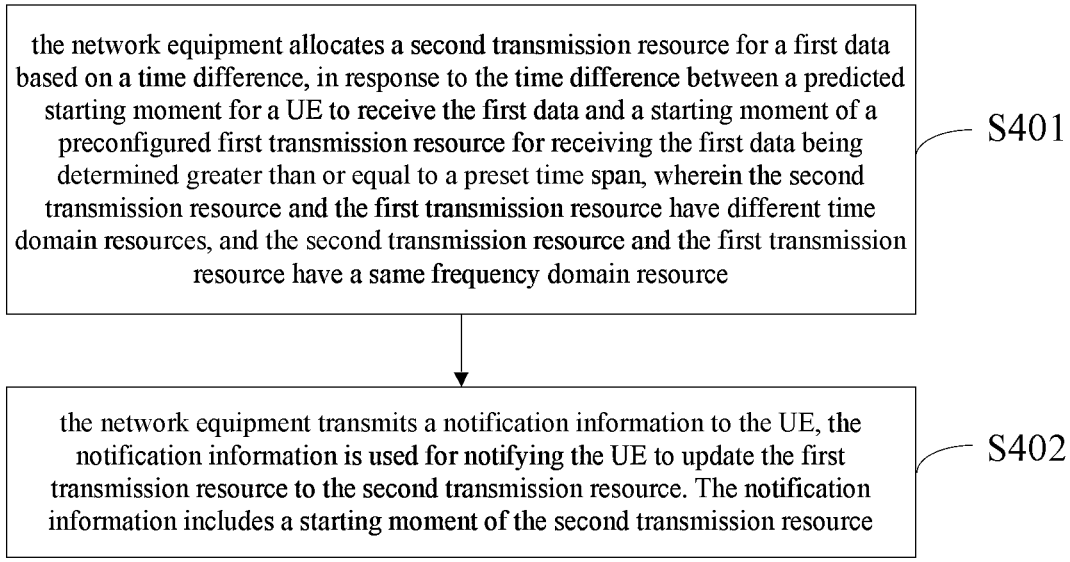
FIG. 4 schematically illustrates a third flowchart of a method for adjusting transmission resource according to an embodiment of the present disclosure.

Further, based on the content described in the foregoing embodiment, referring to FIG. 4, FIG. 4 schematically illustrates a third flowchart of a method for adjusting transmission resource according to an embodiment of the present disclosure, and the method is executed by the network equipment 102 as shown in FIG. 1. In an embodiment of the present disclosure, the method includes S401 and S402.

In S401, the network equipment allocates a second transmission resource for a first data based on a time difference, in response to the time difference between a predicted starting moment for a UE to receive the first data and a starting moment of a preconfigured first transmission resource for receiving the first data being determined greater than or equal to a preset time span, wherein the second transmission resource and the first transmission resource have different time domain resources, and the second transmission resource and the first transmission resource have a same frequency domain resource.

Wherein, the content described in S401 is basically the same as the principle of the technical solution described in S201 in the foregoing embodiment. For details, reference may be made to the content described in the foregoing embodiment, which will not be repeated here.

In S402, the network equipment transmits a notification information to the UE, the notification information is used for notifying the UE to update the first transmission resource to the second transmission resource. The notification information includes a starting moment of the second transmission resource.

In the embodiment of the present disclosure, after determining that the time difference between the predicted starting moment for the UE to receive the first data and the starting moment of the preconfigured first transmission resource for receiving the first data is greater than or equal to a preset time span, the network equipment allocates the second transmission resource for the first data based on the time difference, and transmits the starting moment of the second transmission resource directly to the UE through the notification information. After receiving the notification information, the UE may determine the second transmission resource based on the starting moment of the second transmission resource, and receive the first data on the second transmission resource.

Wherein, if sizes of the first transmission resource and the second transmission resource are the same, the UE may also determine an ending moment of the second transmission resource based on the starting moment and an ending moment of the first transmission resource and the starting moment of the second transmission resource, and determine the second transmission resource.

If the size of the first transmission resource is different from the size of the second transmission resource, the UE needs to determine a difference in the time domain between the first transmission resource and the second transmission resource, and then the UE may determine the ending moment of the second transmission resource based on the starting moment and the ending moment of the first transmission resource, the starting moment of the second transmission resource and the difference, thereby determining the second transmission resource.

According to the method for adjusting transmission resource provided in embodiments of the present disclosure, after allocating the second transmission resource for the first data, the network equipment may transmit the starting moment of the second transmission resource to the UE. The UE may update the first transmission resource to the second transmission resource based on the starting moment of the second transmission resource, and receive the first data on the second transmission resource.

Further, based on the content described in the foregoing embodiment, in an embodiment of the present disclosure, the notification information may be a Downlink Control Information (DCI).

Wherein, the notification information may include an index of the first transmission resource. For example, if the notification information is a DCI, an Index indication may be included in the DCI for indicating a position of the first transmission resource, for example, the Index indication is used for indicating which set of transmission resource the first transmission resource belongs to (one UE may configure a plurality of sets of transmission resource at a same time).

In another embodiment of the present disclosure, the notification information may also include a relative position information between the first transmission resource and a current transmission resource for transmitting the notification information.

Wherein, the relative position information includes a number of resource blocks in a spacing between the first transmission resource and the current transmission resource.

Specifically, after receiving the DCI, the UE may determine a latest block of transmission resource after the current transmission resource for transmitting the DCI, or a N-th block of transmission resource after the current transmission resource as the above-mentioned first transmission resource. Wherein, the value of N may be agreed upon in a protocol or notified to the UE from the network equipment through the notification information, for example, the value of N is directly indicated in the DCI.

In the embodiment of the present disclosure, after determining that the time difference between the predicted starting moment for the UE to receive the first data and the starting moment of the preconfigured first transmission resource for receiving the first data is greater than or equal to the preset time span, the network equipment may transmit the index of the first transmitting resource and/or the relative position information between the first transmission resource and a current transmission resource to the UE, which makes the UE can determine the first transmission resource based on the index and/or the relative position information.

In an embodiment of the present disclosure, the notification information may be a Down Link Medium Access Control Control Element (DL MAC CE) information.

Wherein, a DL MAC CE information may be transmitted on the current transmission resource, the DL MAC CE information may include a time indication information for the next transmission resource, the time indication information is used for indicating a time shift of an actual starting moment of the next transmission resource relative to a preconfigured starting moment of the next transmission resource.

In the embodiment of the present disclosure, the network equipment may transmit the time indication information for the next transmission resource to the UE through the DL MAC CE information, which ensures that the starting moment for the UE to receive data next time is the same as or close to the starting moment of the next transmission resource, thereby reducing or eliminating the delay generated by the UE when receiving data.

Figure 5:
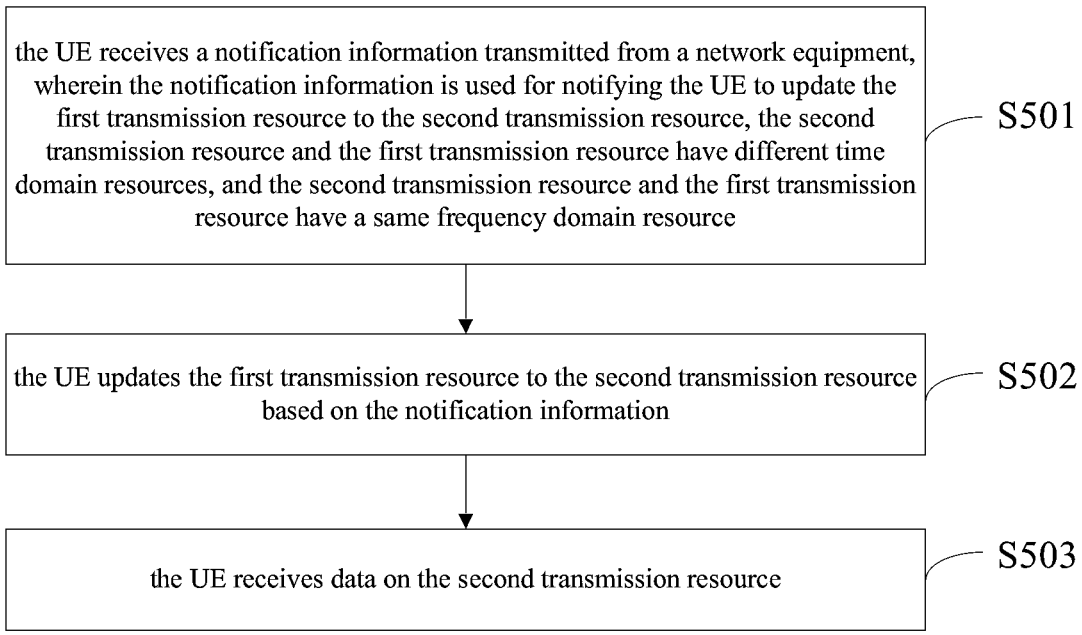
FIG. 5 schematically illustrates a fourth flowchart of a method for adjusting transmission resource according to an embodiment of the present disclosure.

Further, in an embodiment of the present disclosure, a method for adjusting transmission resource is provided, referring to FIG. 5, FIG. 5 schematically illustrates a fourth flowchart of a method for adjusting transmission resource according to an embodiment of the present disclosure, and the method is executed by the UE 101 as shown in FIG. 1. As shown in FIG. 5, the method includes S501, S502 and S503.

In S501, the UE receives a notification information transmitted from a network equipment, wherein the notification information is used for notifying the UE to update the first transmission resource to the second transmission resource, the second transmission resource and the first transmission resource have different time domain resources, and the second transmission resource and the first transmission resource have a same frequency domain resource.

In S502, the UE updates the first transmission resource to the second transmission resource based on the notification information.

In S503, the UE receives data on the second transmission resource.

In the embodiment of the present disclosure, the network equipment may predict in advance whether the time difference between the starting moment for the UE to receive the data that is available for transmission in each period and the starting moment of the transmission resource for receiving the data is greater than or equal to the preset time span. When a time difference between a starting moment for the UE to receive a first data that is available for transmission in a certain period and a starting moment of a first transmission resource for receiving the first data is greater than or equal to the preset time span, the network equipment allocates the second transmission resource for the first data based on the time difference, wherein the second transmission resource and the first transmission resource have different time domain resources, but a same frequency domain resource.

Wherein, after allocating the second transmission resource, the network equipment transmits the notification information to the UE. After receiving the notification information transmitted by the network equipment, the UE updates the first transmission resource to the second transmission resource based on the notification information, and receives the first data through the second transmission resource but not through the first transmission resource.

The UE no longer receives the first data through the first transmission resource means that the UE no longer performs reception and decoding on the first transmission resource, and no longer performs feedback on the first transmission resource, which effectively avoids a waste of transmission resource and an unnecessary energy consumption.

It should be understood that, if the starting moment of the second transmission resource is the same as the predicted starting moment for receiving the first data, or the time difference between the starting moment of the second transmission resource and the predicted starting moment for receiving the first data is less than the preset time span, the UE may receive the first data through the second transmission resource in time, so the delay in receiving the first data by the UE can be effectively eliminated or reduced.

Wherein, functions that can be implemented by the UE in the embodiment of the present disclosure are the same as functions that can be implemented by the UE in the embodiment described in FIG. 2 in the above-mentioned embodiment, reference may be made to the content described in the foregoing embodiment, which will not be repeated here.

The method for adjusting transmission resource provided in the embodiment of the present disclosure is applied at the UE side. After receiving the notification information transmitted from the network equipment, the UE updates the first transmission resource to the second transmission resource, and receives the first data on the second transmission resource but not on the first transmission resource, which effectively eliminates or reduces a delay generated when the UE receives the first data.

In an embodiment of the present disclosure, the notification information includes a time indication information, and the time indication information is used for indicating a time shift of the starting moment of the second transmission resource relative to the starting moment of the first transmission resource.

Wherein, the UE updates the first transmission resource to the second transmission resource based on the notification information in S502 includes Sa1, Sa2 and Sa3.

In Sa1, the UE determines the time shift of the starting moment of the second transmission resource relative to the starting moment of the first transmission resource based on the time indication information.

In Sa2, the UE determines the first transmission resource.

In Sa3, the UE determines the second transmission resource based on the first transmission resource and the time shift.

In the embodiment of the present disclosure, the UE may determine a time shift of the starting moment of the second transmission resource relative to the starting moment of the first transmission resource based on the time shift, and determine the starting moment of the second transmission resource bused on the starting moment of the first transmission resource and the time shift.

Wherein, in an embodiment of the present disclosure, the time indication information may be a specific time shift determined by the network equipment directly, the time shift is a time shift of the starting moment of the second transmission resource relative to the starting moment of the first transmission resource.

In an embodiment of the present disclosure, the time indication information may include an index of a time shift, the index of the time shift includes a time shift of the starting moment of the second transmission resource relative to the starting moment of the first transmission resource.

The UE determines the time shift of the starting moment of the second transmission resource relative to the starting moment of the first transmission resource based on the time indication information in Sa1 includes: the UE determines the time shift of the starting moment of the second transmission resource relative to the starting moment of the first transmission resource based on the index of the time shift.

Specifically, the UE may pre-configure a plurality of possible time shifts, after determining the time difference between the predicted starting moment for the UE to receive the first data and the starting moment of the preconfigured first transmission resource for receiving the first data, the network equipment may search for a time shift that is closest to the time difference among the plurality of possible time shifts preconfigured by the UE, and transmit an index of the searched time shift to the UE. After receiving the index, the UE may determine a particular time shift from the preconfigured plurality of time shifts based on the index, and determine the particular time shift as a time shift of the starting moment of the second transmission resource relative to the starting moment of the first transmission resource.

For example, a UE may pre-configure a plurality of possible time shifts t1, t2, t3, t4 and t5, after determining a time difference between a predicted starting moment for the UE to receive a first data and a starting moment of a preconfigured first transmission resource for receiving the first data, if the time shift t3 is determined as a time shift which is closest to the time difference, a network equipment transmits an index corresponding to the t3 to the UE. After receiving the index, the UE determines the time shift t3 based on the index, and determines the time shift t3 as a time shift of the starting moment of the second transmission resource relative to the starting moment of the first transmission resource.

Figure 6:
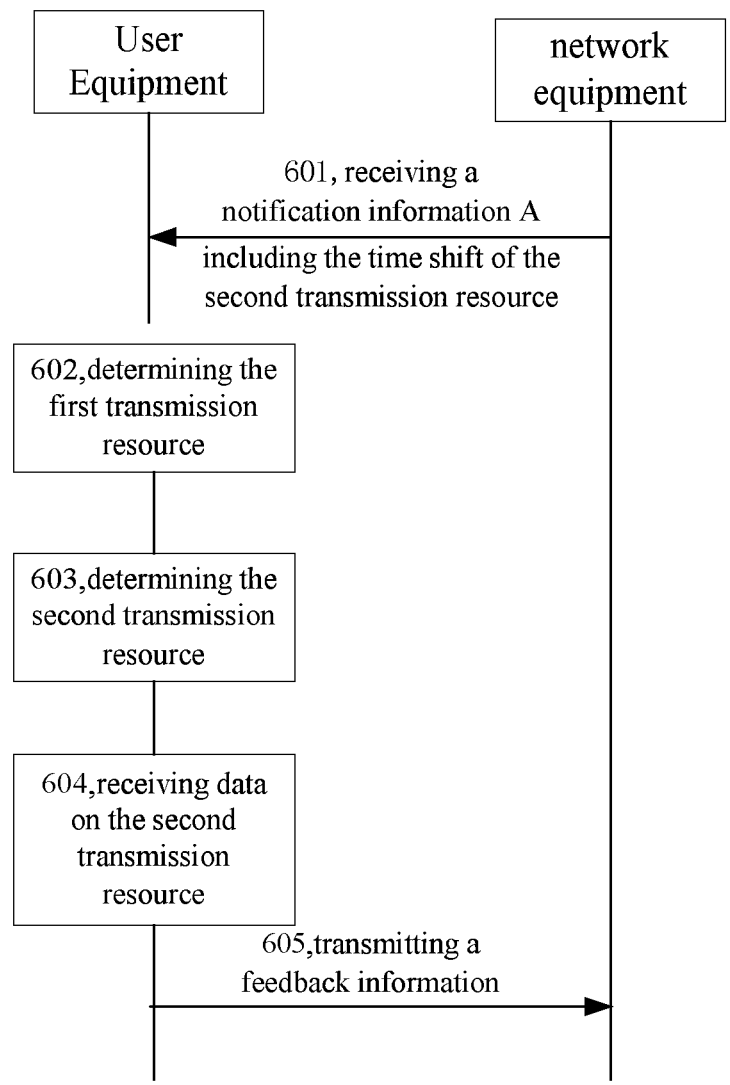
FIG. 6 schematically illustrates a first signaling diagram of a method for adjusting transmission resource according to an embodiment of the present disclosure.

For better understanding of the embodiment of the present disclosure, referring to FIG. 6. FIG. 6 schematically illustrates a first signaling diagram of a method for adjusting transmission resource according to an embodiment of the present disclosure. The method for adjusting transmission resource provided in the embodiment may include 601, 602, 603, 604 and 605.

In 601, the UE receives a notification information A, the notification information A includes the time shift of the starting moment of the second transmission resource relative to the starting moment of the first transmission resource.

In 602, the UE determines the first transmission resource.

In 603, the UE determines the second transmission resource based on the first transmission resource and the time shift.

In 604, the UE receives data on the second transmission resource.

In 605, the UE transmits a feedback information to the network equipment on the second transmission resource.

In the embodiment of the present disclosure, the UE may determine the starting moment of the second transmission resource based on the received time shift, update the first transmission resource to the second transmission resource based on the starting moment of the second transmission resource, and receive the first data on the second transmission resource.

Further, in an embodiment of the present disclosure, the notification information may include a starting moment of the second transmission resource.

Wherein, the UE updates the first transmission resource to the second transmission resource based on the notification information in S302 includes Sb1 and Sb2.

In Sb1, the UE determines the first transmission resource.

In Sb2, the UE determines the second transmission resource based on the first transmission resource and the time shift.

In the embodiment of the present disclosure, after determining that the time difference between the predicted starting moment for the UE to receive the first data and the starting moment of the preconfigured first transmission resource for receiving the first data is greater than or equal to a preset time span, the network equipment allocates the second transmission resource for the first data based on the time difference, and transmits the starting moment of the second transmission resource directly to the UE through the notification information. After receiving the notification information, the UE may determine the second transmission resource based on the starting moment of the second transmission resource, and receive the first data on the second transmission resource.

Figure 7:
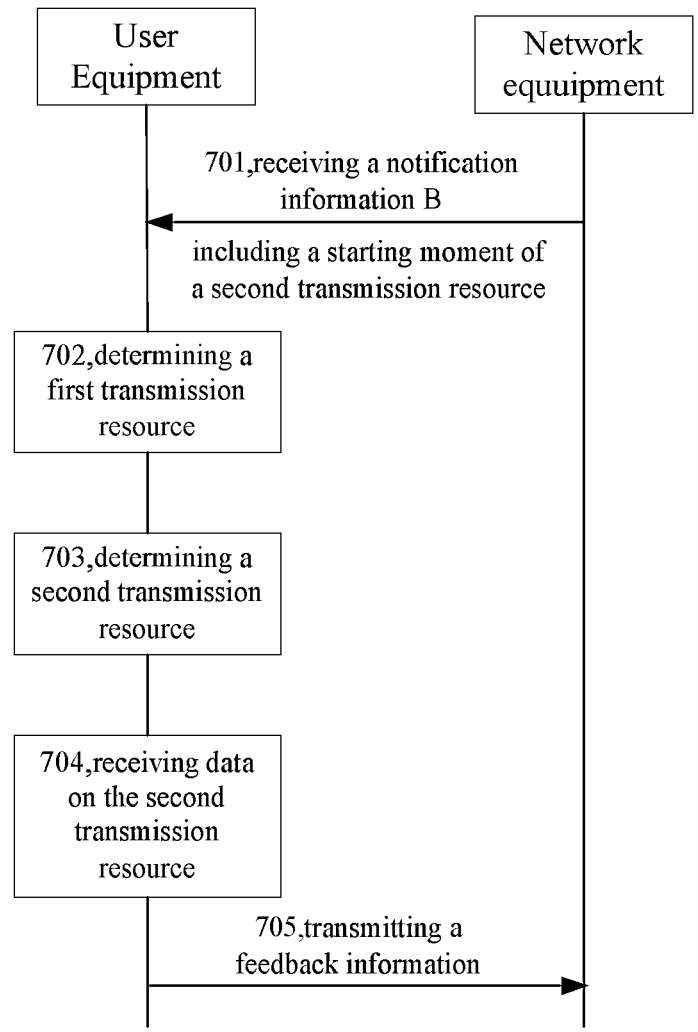
FIG. 7 schematically illustrates a second signaling diagram of a method for adjusting transmission resource according to an embodiment of the present disclosure.

For better understanding of the embodiment of the present disclosure, referring to FIG. 7. FIG. 7 schematically illustrates a second signaling diagram of a method for adjusting transmission resource according to an embodiment of the present disclosure. The method for adjusting transmission resource provided in the embodiment may include 701, 702, 703, 704 and 705.

In 701, a UE receives a notification information B, the notification information B includes a starting moment of a second transmission resource.

In 702, the UE determines a first transmission resource.

In 703, the UE determines the second transmission resource based on the first transmission resource and the starting moment of the second transmission resource.

In 704, the UE receives data on the second transmission resource.

In 705, the UE transmits a feedback information to a network equipment on the second transmission resource.

According to the method for adjusting transmission resource provided in embodiments of the present disclosure, after allocating the second transmission resource for the first data, the network equipment may transmit the starting moment of the second transmission resource to the UE. The UE may update the first transmission resource to the second transmission resource based on the starting moment of the second transmission resource, and receive the first data on the second transmission resource.

Further, based on the content described in the foregoing embodiment, in an embodiment of the present disclosure, the notification information may be a DCI.

Wherein, the notification information may include an index of the first transmission resource, after receiving the notification information, the UE may determine the first transmission resource based on the index of the first transmission resource.

For example, if the notification information is a DCI, an Index indication may be included in the DCI for indicating a position of the first transmission resource. For example, the Index indication is used for indicating which set of transmission resource the first transmission resource belongs to (one UE may configure a plurality of sets of transmission resource at the same time). After receiving the DCI, the UE may determine the first transmission resource based on the Index indication.

In an embodiment of the present disclosure, the notification information may also include a relative position information between the first transmission resource and a current transmission resource for transmitting the notification information. The UE may determine the first transmission resource based on the position of the current transmission resource and the relative position information.

Wherein, the relative position information includes a number of resource blocks in a spacing between the first transmission resource and the current transmission resource.

Specifically, after receiving the DCI, the UE may determine a latest block of transmission resource after the current transmission resource for transmitting the DCI, or a N-th block of transmission resource after the current transmission resource as the above-mentioned first transmission resource. Wherein, the value of N may be agreed upon in a protocol or notified to the UE from the network equipment through the notification information, for example, the value of N is directly indicated in the DCI.

In addition, in the embodiment of the present disclosure, a 1st/M-th block transmission resource before/after the second transmission resource in the time domain may also be determined as the above-mentioned first transmission resource. Wherein, the value of M may be agreed upon in a protocol or notified to the UE by the network equipment through the notification information, for example, the value of N is directly indicated in the DCI.

In an embodiment of the present disclosure, a method for a UE to determine a first transmission resource further includes: the UE determines the first transmission resource based on a current transmission resource for transmitting the notification information and a predefined information, wherein the predefined information includes a relative position information between the first transmission resource and a current transmission resource.

According to the method provided in the embodiment of the present disclosure, the UE may determine the first transmission resource based on the index of the first transmission resource and/or the relative position information between the first transmission resource and the current transmission resource for transmitting the notification information.

In an embodiment of the present disclosure, the notification information may be a DL MAC CE information.

Wherein, the UE may receive the DL MAC CE information on the current transmission resource, and determine the time shift of an actual starting moment of the next transmission resource relative to the preconfigured starting moment of the next transmission resource based on the time indication information of the next transmission resource included in the DL MAC CE information.

In the embodiment of the present disclosure, the UE may determine the time shift of the actual starting moment of the next transmission resource relative to the preconfigured starting moment of the next transmission resource based on the received DL MAC CE information, and update the transmission resource, which ensures that the starting moment for the UE to receive data next time is the same as or close to the starting moment of the next transmission resource, thereby reducing or eliminating the delay generated by the UE when receiving data.

Figure 8:
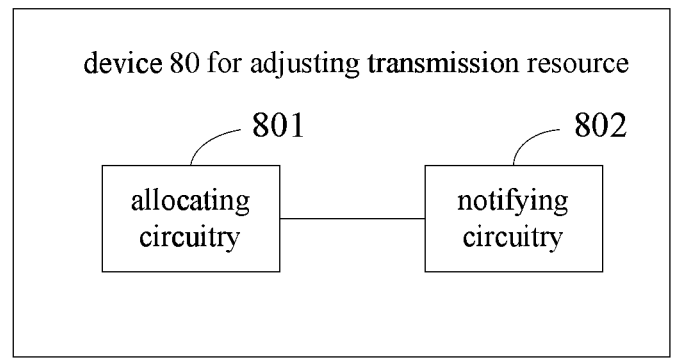
FIG. 8 schematically illustrates a first circuitry diagram of a device for adjusting transmission resource according to an embodiment of the present disclosure.

Further, in an embodiment of the present disclosure, a device for adjusting transmission resource is provided, referring to FIG. 8. FIG. 8 schematically illustrates a first circuitry diagram of a device for adjusting transmission resource according to an embodiment of the present disclosure. The embodiment is executed by the network equipment 102 as shown in the embodiment FIG. 1. As shown in FIG. 8, the device 80 includes an allocating circuitry 801, and a notifying circuitry 802.

The allocating circuitry 801 is adapted to allocate a second transmission resource for a first data based on a time difference, in response to the time difference between a predicted starting moment for the UE to receive the first data and a starting moment of a preconfigured first transmission resource for receiving the first data being determined greater than or equal to a preset time span, wherein the second transmission resource and the first transmission resource have different time domain resources, and the second transmission resource and the first transmission resource have a same frequency domain resource.

The notifying circuitry 802 is adapted to transmit a notification information to the UE, the notification information is used for notifying the UE to update the first transmission resource to the second transmission resource.

Wherein, the principle of functions that can be implemented by the above-mentioned device 80 is basically the same as the principle of the technical solution of the method described in FIG. 2 in the above-mentioned embodiment, reference may be made to the content described in the foregoing embodiment, which will not be repeated here.

In an embodiment of the present disclosure, the notification information includes a time indication information, and the time indication information is used for indicating a time shift of the starting moment of the second transmission resource relative to the starting moment of the first transmission resource.

In an embodiment of the present disclosure, the notification information includes the starting moment of the second transmission resource.

In an embodiment of the present disclosure, the time indication information may be a time shift, the time shift is a time shift of the starting moment of the second transmission resource relative to the starting moment of the first transmission resource.

In an embodiment of the present disclosure, the time indication information may include an index of the time shift, the index of the time shift includes the time shift of the starting moment of the second transmission resource relative to the starting moment of the first transmission resource.

In an embodiment of the present disclosure, the notification information may also include an index of the first transmission resource.

In an embodiment of the present disclosure, the notification information may also include the relative position information between the first transmission resource and a current transmission resource for transmitting the notification information.

In an embodiment of the present disclosure, the relative position information includes a number of resource blocks in a spacing between the first transmission resource and the current transmission resource.

In an embodiment of the present disclosure, the notification information may be a DL MAC CE information.

In an embodiment of the present disclosure, the notification information may be a DCI.

In an embodiment of the present disclosure, the device further includes: a predicting circuitry adapted to determine the time difference between the predicted starting moment of the first data and the starting moment of the first transmission resource.

Figure 9:
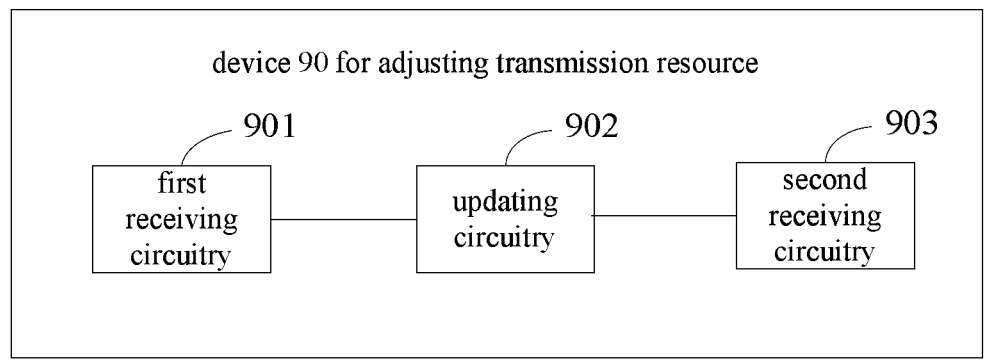
FIG. 9 schematically illustrates a second circuitry diagram of a device for adjusting transmission resource according to an embodiment of the present disclosure.

Further, in an embodiment of the present disclosure, a device for adjusting transmission resource is provided. Referring to FIG. 9, FIG. 9 schematically illustrates a second circuitry diagram of a device for adjusting transmission resource according to an embodiment of the present disclosure. The embodiment is executed by the UE 101 as shown in the embodiment FIG. 1. As shown in FIG. 9, the device 90 includes a first receiving circuitry 901, an updating circuitry 902 and a second receiving circuitry 903.

The first receiving circuitry 901 is adapted to receive a notification information transmitted from a network equipment, wherein the notification information is used for notifying the UE to update the first transmission resource to the second transmission resource, the second transmission resource and the first transmission resource have different time domain resources, and the second transmission resource and the first transmission resource have a same frequency domain resource.

The updating circuitry 902 is adapted to update the first transmission resource to the second transmission resource based on the notification information.

The second receiving circuitry 903 is adapted to receive data on the second transmission resource.

Wherein, the principle of functions that can be implemented by the above-mentioned device 90 is basically the same as the principle of the technical solution of the method described in FIG. 5 in the above-mentioned embodiment, reference may be made to the content described in the foregoing embodiment, which will not be repeated here.

In an embodiment of the present disclosure, the notification information includes a time indication information, and the time indication information is used for indicating a time shift of the starting moment of the second transmission resource relative to the starting moment of the first transmission resource.

The updating circuitry 902 includes: a first determining circuitry which is adapted to determine the time shift of the starting moment of the second transmission resource relative to the starting moment of the first transmission resource based on the time indication information; a second determining circuitry which is adapted to determine the first transmission resource; a third determining circuitry which is adapted to determine the second transmission resource based on the first transmission resource and the time shift.

In an embodiment of the present disclosure, the notification information includes the starting moment of the second transmission resource.

The updating circuitry is adapted to determine the first transmission resource, and determine the second transmission resource based on the starting moment of the second transmission resource and the first transmission resource.

In an embodiment of the present disclosure, the time indication information may be a time shift, the time shift is a time shift of the starting moment of the second transmission resource relative to the starting moment of the first transmission resource.

In an embodiment of the present disclosure, the time indication information may include an index of the time shift, the index of the time shift includes the time shift of the starting moment of the second transmission resource relative to the starting moment of the first transmission resource. The first determining circuitry is adapted to determine the time shift of the starting moment of the second transmission resource relative to the starting moment of the first transmission resource based on the index of the time shift.

In an embodiment of the present disclosure, the notification information may also include an index of the first transmission resource. The first determining circuitry is adapted to determine the first transmission resource based on the index of the first transmission resource.

In an embodiment of the present disclosure, the notification information may also include a relative position information between the first transmission resource and a current transmission resource for transmitting the notification information. The first determining circuitry is adapted to determine the first transmission resource based on the position of the current transmission resource and the relative position information.

In an embodiment of the present disclosure, the relative position information includes a number of resource blocks in a spacing between the first transmission resource and the current transmission resource.

In an embodiment of the present disclosure, the first determining circuitry is adapted to determine the first transmission resource based on the current transmission resource for transmitting the notification information and a predefined information, wherein the predefined information includes a relative position information between the first transmission resource and a current transmission resource.

In an embodiment of the present disclosure, the device further includes a canceling circuitry which is adapted to cancel a reception and a decoding on the first transmission resource, and a feedback on the first transmission resource.

In an embodiment of the present disclosure, the notification information may be a DL MAC CE information.

In an embodiment of the present disclosure, the notification information may be a DCI.

Further, in an embodiment of the present disclosure, a network equipment is provided, including: at least one processor and a memory; the memory is used for storing the computer-executable instructions; the at least one processor is used for executing computer-implemented instructions stored in the memory, so that the at least one processor executes the method for adjusting transmission resource as shown in FIG. 2.

Further, in an embodiment of the present disclosure, a UE is provided, including: at least one processor and a memory; the memory is used for storing the computer-executable instructions; and the at least one processor is used for executing computer-implemented instructions stored in the memory, so that the at least one processor executes the method for adjusting transmission resource as shown in FIG. 5.

The network equipment and the UE provided in the embodiments can be respectively used to implement the technical solutions of the method embodiments, and the implementation principles and technical effects thereof are similar, which will not be repeated here.

Figure 10:
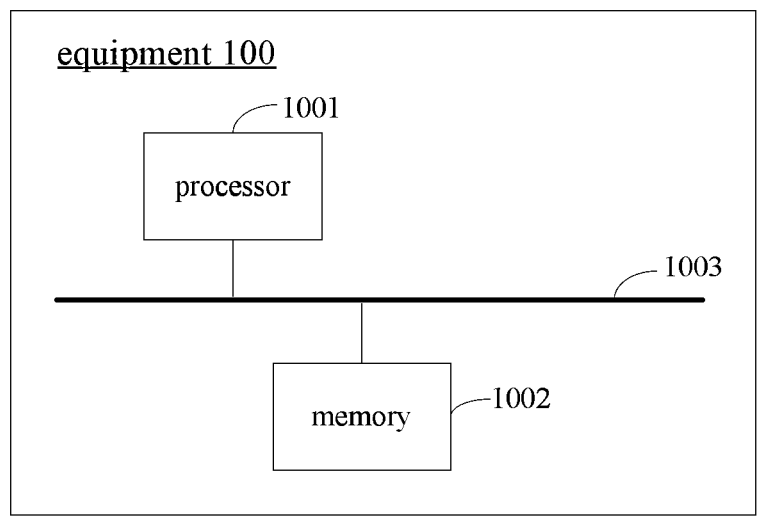
FIG. 10 schematically illustrates a hardware structure diagram of a equipment according to an embodiment of the present disclosure.

For better understanding of the embodiment of the present disclosure, referring to FIG. 10. FIG. 10 schematically illustrates a hardware structure diagram of an equipment according to an embodiment of the present disclosure. As shown in the FIG. 10, if a device 100 is the network equipment in FIG. 1, the device 100 includes: a processor 1001 and a memory 1002.

Wherein, the memory 1002 is adapted to store the computer-executable instructions; and the processor 1001 is adapted to execute computer-implemented instructions stored in the memory, to realize the processes executed by the network equipment according to above-mentioned embodiments. For details, refer to the relevant descriptions in the above-mentioned method embodiments.

Or, if the device 100 is the UE in the FIG. 1, the device 100 includes: a processor 1001 and a memory 1002.

Wherein, the memory 1002 is adapted to store the computer-executable instructions; and the processor 1001 is adapted to execute computer-implemented instructions stored in the memory, to realize the processes executed by the UE according to above-mentioned embodiments. For details, refer to the relevant descriptions in the above-mentioned method embodiments.

In some embodiment, the memory 1002 may be independent or integrated with the processor 1001.

When the memory 1002 is set independently, the device 100 further includes a bus 1003 for connecting the memory 1002 and the processor 1001.

In an embodiment of the present disclosure, a computer readable storage medium is provided, the computer readable storage has computer instructions stored therein, wherein once the computer instructions are executed, the method applied at the network equipment side performed.

In an embodiment of the present disclosure, a computer readable storage medium is provided, the computer readable storage has computer instructions stored therein, wherein once the computer instructions are executed, the method applied at the UE side performed.

In the above embodiments of the present disclosure, it should be understood that the disclosed method, device and system may be implemented in other ways. For example, the above device embodiments are merely illustrative, and for example, division of units is merely one logical division, and other divisions may be realized in practice, for example, a plurality of units or components may be combined or integrated into another system, or some features may be omitted, or not executed. Further, the shown or discussed mutual coupling or direct coupling or communication connection may be an indirect coupling or communication connection via some interfaces, devices or units, and may be in an electrical, mechanical or other form.

The units described as separate parts may or may not be physically separate, and parts shown as units may or may not be physical units, that is, may be disposed in one place, or may be distributed on a plurality of network units. Some or all of the units can be selected according to practical requirements to achieve the purpose of the solutions of the embodiments.

In addition, functional units in the embodiments of the present disclosure may be integrated in one processing unit, or each unit may be physically separate, or two or more units may be integrated in one unit. The integrated units can be realized in a form of hardware, or in a form of hardware plus a software functional unit.

The integrated units implemented in the form of the software functional unit may be stored in a computer readable storage medium. The software functional unit is stored in a storage medium and includes several instructions for causing a computer device (a personal computer, a server or a network device) or a processor to execute some steps of the methods in the embodiments of the present disclosure.

It should be understood that, in the embodiments of the present disclosure, the processor may be a Central Processing Unit (CPU), or other general processors, Digital Signal Processors (DSPs), Application Specific Integrated Circuits (ASICs), and the like. A general processor may be a microprocessor or the processor may be any conventional processor or the like. The steps of the method in embodiment disclosure can be directly embodied as executed by a hardware processor, or executed by a combination of hardware and software modules in the processor.

The memory in the embodiments of the present disclosure may include a high-speed RAM memory, or may also include a nonvolatile NVM. Such as at least one magnetic disk memory, and may also be a U disk, a removable hard disk, a read-only memory, a magnetic disk or an optical disk, and the like.

The bus may be an Industry Standard Architecture (ISA) bus, a Peripheral Component (PCI) bus, or an Extended Industry Standard Architecture (EISA) bus, or the like. The bus can be divided into an address bus, a data bus, a control bus and so on. For convenience of representation, the buses in the drawings of the present disclosure are not limited to only one bus or one type of bus.

The above-mentioned storage medium can be implemented by any type of volatile or non-volatile storage device or a combination thereof, such as a Static Random Access Memory (SRAM), an electrically Erasable Programmable Read-Only Memory (EEPROM), an Erasable Programmable Read-Only Memory (EPROM), a Programmable Read-Only Memory (PROM), a Read-Only Memory, a magnetic memory, a flash memory, a magnetic disk or an optical disk. A storage medium can be any available medium that can be accessed by a general purpose or special purpose computer.

An exemplary storage medium is coupled to the processor, such that the processor can read information from the storage medium, and write information to the storage medium. Of course, the storage medium may also be an integral part of the processor. The processor and the storage medium may be located in Application Specific Integrated Circuits (ASIC). Of course, the processor and the storage medium may also exist in the electronic device or the host device as discrete components.

Those of ordinary skill in the art can understand that all or part of the steps for implementing the above method embodiments may be completed by program instructions related to hardware. The aforementioned program may be stored in a computer-readable storage medium. When the program is executed, the steps including the above method embodiments are executed; and the aforementioned storage medium includes: ROM, RAM, magnetic disk or optical disk and other medium that can store program codes.

Although the present disclosure is disclosed as above, the present disclosure is not limited to this. Those skilled in the art can make various changes and modifications without departing from the spirit and scope of the present disclosure. Therefore, the protection scope of the present disclosure should be subject to the scope defined by the claims.

What is claimed is:

1. A method for adjusting transmission resource, applied at a User Equipment (UE) side, comprising:

receiving a notification information transmitted from a network equipment, wherein the notification information is used for notifying the UE to update a first transmission resource to a second transmission resource, the second transmission resource and the first transmission resource have different time domain resources, and the second transmission resource and the first transmission resource have a same frequency domain resource;

updating the first transmission resource to the second transmission resource based on the notification information; and receiving data on the second transmission resource;

wherein the notification information comprises a time indication information, and the time indication information is used for indicating a time shift of a starting moment of the second transmission resource relative to the starting moment of the first transmission resource;

said updating the first transmission resource to the second transmission resource based on the notification information comprises:

determining the time shift of the starting moment of the second transmission resource relative to the starting moment of the first transmission resource based on the time indication information;

determining the first transmission resource; and determining the second transmission resource based on the first transmission resource and the time shift.

2. The method according to claim 1, wherein the time indication information comprises a time shift, and the time shift comprises the time shift of the starting moment of the second transmission resource relative to the starting moment of the first transmission resource.

3. The method according to claim 1, wherein the time indication information comprises an index of a time shift, and the time shift comprises the time shift of the starting moment of the second transmission resource relative to the starting moment of the first transmission resource;

said determining the time shift of the starting moment of the second transmission resource relative to the starting moment of the first transmission resource based on the time indication information comprises:

determining the time shift of the starting moment of the second transmission resource relative to the starting moment of the first transmission resource based on the index of the time shift.

4. The method according to claim 1, wherein the notification information further comprises an index of the first transmission resource;

said determining the first transmission resource comprises:

determining the first transmission resource based on the index of the first transmission resource.

5. The method according to claim 1, wherein the notification information further comprises:

a relative position information between the first transmission resource and a current transmission resource for transmitting the notification information;

said determining the first transmission resource comprises:

determining the first transmission resource based on a position of the current transmission resource and the relative position information.

6. The method according to claim 5, wherein the relative position information comprises a number of resource blocks in a spacing between the first transmission resource and the current transmission resource.

7. The method according to claim 1, wherein said determining the first transmission resource comprises:

determining the first transmission resource based on a current transmission resource for transmitting the notification information and a predefined information, wherein the predefined information comprises a relative position information between the first transmission resource and a current transmission resource.

8. The method according to claim 1, further comprising:

after updating the first transmission resource to the second transmission resource, canceling a reception and a decoding on the first transmission resource, and a feedback on the first transmission resource.

9. The method according to claim 1, wherein the notification information comprises a Down Link Medium Access Control Control Element (DL MAC CE) information.

10. The method according to claim 1, wherein the notification information comprises a Downlink Control Information (DCI).

* * * * *